(12) United States Patent
Nusier et al.

(10) Patent No.: US 10,439,183 B2
(45) Date of Patent: *Oct. 8, 2019

(54) IMPACT ABSORBING ELEMENTS ATTACHED TO THE OUTER SURFACE OF A BATTERY ENCLOSURE

(71) Applicant: Ford Global Technologies, LLC, Dearborn, MI (US)

(72) Inventors: Saied Nusier, Canton, MI (US); Saeed David Barbat, Novi, MI (US); William L. Stanko, Canton, MI (US); Mohamed Ridha Baccouche, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 759 days.

This patent is subject to a terminal disclaimer.

(21) Appl. No.: 14/619,412

(22) Filed: Feb. 11, 2015

(65) Prior Publication Data
US 2016/0233467 A1    Aug. 11, 2016

(51) Int. Cl.
*H01M 2/10*    (2006.01)
(52) U.S. Cl.
CPC ....... *H01M 2/1083* (2013.01); *H01M 2/1077* (2013.01); *H01M 2220/20* (2013.01)
(58) Field of Classification Search
CPC .. H01M 2/10; H01M 2220/20; H01M 2/1083; H01M 2/1077
See application file for complete search history.

(56) References Cited

U.S. PATENT DOCUMENTS

| 2,671,599 | A | 3/1954 | Price |
| 5,156,225 | A | 10/1992 | Murrin |
| 6,279,300 | B1 | 8/2001 | Simhaee |
| 6,300,005 | B1 | 10/2001 | Kump |
| 7,572,550 | B2 | 8/2009 | Saito et al. |

(Continued)

FOREIGN PATENT DOCUMENTS

| CN | 102593399 A | 7/2012 |
| CN | 103000835 | 3/2013 |

(Continued)

OTHER PUBLICATIONS

Machine Translation TW-201421776.*
Dr. Lothar Wech, et al., Crash Safety Aspects of HV Batteries for Vehicles, Paper No. 11-0302, 2011.

*Primary Examiner* — Stephen J Yanchuk
(74) *Attorney, Agent, or Firm* — Vichit Chea; Brooks Kushman P.C.

(57) ABSTRACT

A battery housing for a traction motor battery of a vehicle is disclosed that includes a plurality of elongated impact absorbing members attached to the walls of the enclosure. The impact absorbing members may be integrally formed with the walls of the enclosure. The impact absorbing members include an arcuate wall that is designed to be deformed in the event of an impact to absorb impact forces and protect the battery. The impact absorbing members may be oriented to extend either in a horizontal orientation or vertical orientation. The impact absorbing members may be retained by T-shaped guide on the outer surface of the walls of the enclosure or may be integrally formed in one piece on the outer surface of each of the walls of the enclosure.

6 Claims, 7 Drawing Sheets

(56) References Cited

U.S. PATENT DOCUMENTS

| | | | |
|---|---|---|---|
| 8,573,647 B2 | 11/2013 | Enning | |
| 8,632,902 B2 | 1/2014 | Wendorf et al. | |
| 8,702,161 B2 | 4/2014 | Charbonneau et al. | |
| 2003/0124315 A1 | 7/2003 | Grochoski | |
| 2007/0026305 A1* | 2/2007 | Jeon | H01M 2/24 |
| | | | 429/159 |
| 2008/0124625 A1 | 5/2008 | Hock et al. | |
| 2009/0136843 A1 | 5/2009 | Yamamoto et al. | |
| 2012/0121946 A1 | 5/2012 | Eckstein et al. | |
| 2012/0183828 A1 | 7/2012 | van den Akker | |
| 2013/0236753 A1 | 9/2013 | Yue et al. | |
| 2014/0045024 A1 | 2/2014 | Waters | |
| 2014/0287297 A1 | 9/2014 | Reitzle et al. | |
| 2016/0233460 A1 | 8/2016 | Nusier et al. | |
| 2016/0233467 A1 | 8/2016 | Nusier et al. | |

FOREIGN PATENT DOCUMENTS

| | | |
|---|---|---|
| CN | 203434226 U | 2/2014 |
| CN | 103730616 A | 4/2014 |
| DE | 102008059941 A1 | 6/2010 |
| DE | 102009053138 A1 | 5/2011 |
| DE | 102010024320 A1 | 12/2011 |
| DE | 102010043899 A1 | 5/2012 |
| DE | 102010050826 A1 | 5/2012 |
| DE | 102011120960 A1 | 4/2013 |
| DE | 102011118284 A1 | 5/2013 |
| DE | 102011120010 A1 | 6/2013 |
| DE | 102012012294 A1 | 12/2013 |
| DE | 102012015919 A1 | 2/2014 |
| ES | 2396407 A2 | 2/2013 |
| GB | 2186253 | 8/1987 |
| JP | 2010126804 A | 6/2010 |
| JP | 2013045715 A | 3/2013 |
| KR | 100210949 B1 | 7/1999 |
| TW | 201421776 | 6/2014 |
| WO | 2012025166 | 3/2012 |
| WO | 2012073439 A1 | 6/2012 |
| WO | 2013079080 A1 | 6/2013 |
| WO | 2013156732 | 10/2013 |
| WO | 2013180611 A1 | 12/2013 |
| WO | 2014034020 | 3/2014 |

\* cited by examiner

IMPACT ABSORBING ELEMENTS ATTACHED TO THE OUTER SURFACE OF A BATTERY ENCLOSURE

TECHNICAL FIELD

This disclosure relates to protective structures for battery enclosures for electric vehicle batteries.

BACKGROUND

Electric vehicles use batteries that are enclosed in an enclosure or housing that is assembled to the vehicle body. The battery may be assembled to the vehicle body at a location that is spaced from the front, rear and sides of the vehicle. For example, the battery may be assembled below the passenger compartment, in the trunk, in front of the passenger compartment or in a longitudinally extending tunnel.

The battery must be protected from damage in a collision. The battery housing may be tightly packed with lithium ion battery packs or other types of battery cells. Deformation of the battery housing is to be avoided to prevent intrusion of the housing into the area housing the battery cells. Intrusions into the battery housing may rupture of battery cells and spill the contents of the battery cells.

When the battery housing is assembled in a central location in the vehicle, e.g. beneath the passenger compartment, limited crush space is available between the side of the vehicle body and the battery enclosure. More crush space is available between the battery enclosure and the front or rear ends of the vehicle. In either situation, there is a long felt and unfulfilled need for an efficient and effective lightweight structure for absorbing energy from a collision that minimizes battery enclosure deformation. The structure must have limited package space requirements while providing added stiffness to the battery enclosure assembly including the impact absorbing structure.

Some approaches to protecting the battery enclosure have proposed adding beams and cross members on the battery enclosure or extending outboard of the battery enclosure. These approaches add weight to the vehicle and require additional space to package the beams and cross members. Added weight is to be avoided because added weight adversely affects fuel economy. Increasing packaging space requirements adversely affects vehicle design freedom.

The above problems and other problems are addressed by this disclosure as summarized below.

SUMMARY

According to one aspect of this disclosure, a housing is disclosed for a traction motor battery of a vehicle that comprises a plurality of vertical walls, a top wall and a bottom wall. A plurality of elongated impact absorbing members are attached to each wall with the length of the impact absorbing members on the top wall and the bottom wall extending horizontally and the length of the impact absorbing members on some of the vertical walls extending vertically.

According to other aspects of this disclosure, the impact absorbing members on the top and bottom walls may extend in the horizontally in the fore-and-aft direction. The impact absorbing members may be arc-shaped and may be generated as an arc about an axis of curvature that is parallel to the length of the impact absorbing members. The impact absorbing members on the vertical walls may include front and rear walls that extend in the vertical direction above and below the impact absorbing members on the top and bottom walls.

The impact absorbing members may be retained by T-shaped guides on the outer surface of each of the walls. Alternatively, the impact absorbing members may be integrally formed in one piece on the outer surface of each of the walls.

According to another aspect of this disclosure as it relates to a housing for a fraction motor battery of a vehicle, the housing comprises a plurality of vertical walls including a front wall, a rear wall, a right wall and a left wall. A plurality of elongated impact absorbing members are disposed on outer surfaces of each of the walls. Impact absorbing members on the right wall and the left wall extend horizontally fore-and-aft beyond the front wall and the rear wall.

According to other aspects of this disclosure, the housing may include a top wall and a bottom wall. The impact absorbing members each have a lengthwise dimension and the length of the impact absorbing members on the front wall and rear wall may extend in the vertical direction. The length of the impact absorbing members on the top wall and bottom wall may extend horizontally in the fore-and-aft direction beyond the front wall and the rear wall.

The impact absorbing members each have a length and the impact absorbing members on the front wall and rear wall extend lengthwise in the vertical direction. The impact absorbing members on the right wall and left wall extend lengthwise in the horizontal direction. The impact absorbing members on the top and bottom walls have a length extending in the horizontal direction and are coextensive with the front wall and rear wall.

According to another aspect of this disclosure, a method is disclosed for providing a battery enclosure for a vehicle having a battery powered traction motor. According to the method, a plurality of vertically extending sides and at least one horizontally extending side are provided with each of the sides having a planar wall and a plurality of impact absorbing walls spaced from the planar walls that each define a pocket. The sides are assembled together about the battery to form an impact absorbing assembly outside the battery.

According to other aspects of the method, the impact absorbing walls may be assembled to the planar walls. The planar walls may have T-shaped guides to which the impact absorbing walls are attached. Alternatively, the impact absorbing walls and the planar walls of each of the vertically extending sides and the at least one horizontally extending side may be extruded together in a single piece for each of the walls.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
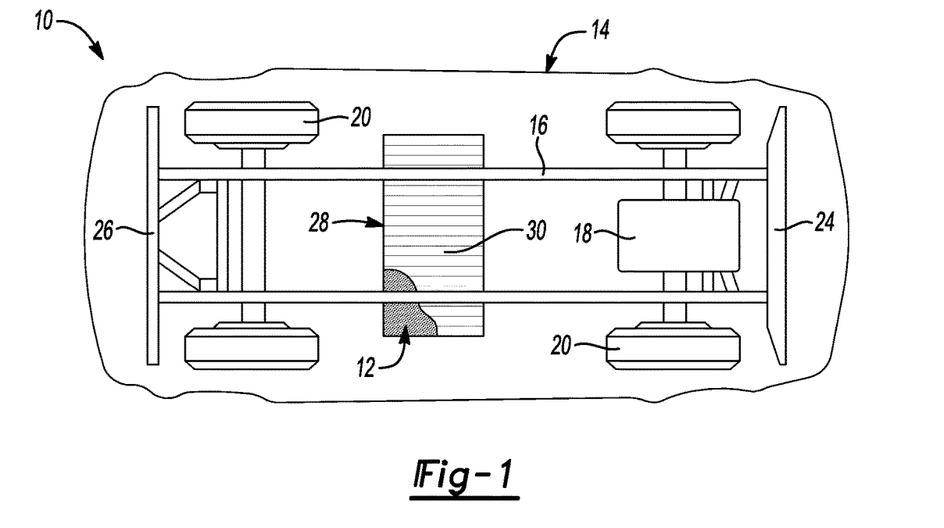
FIG. 1 is a diagrammatic bottom plan view of a vehicle illustrating a battery enclosure disposed on the vehicle frame beneath the passenger compartment.

Referring to FIG. 1, a vehicle 10 is diagrammatically illustrated with a battery 12 for a battery-powered traction motor. The vehicle 10 includes a body 14 that is supported on a frame 16. A traction motor 18 is also assembled to the frame 16. The traction motor 18 is a battery-powered traction motor that is powered by the battery 12 to drive the wheels 20. The body 14 includes a side body 22, a front bumper 24 and a rear bumper 26. The battery 12 is shown to be centrally located underneath the passenger compartment of the vehicle 10. It should be noted that there is a substantially greater amount of space between the battery and the front and rear bumper 24 and 26 compared to the relatively closer spacing of the side body 22 to the battery 12. Side impact collisions that result in driving the side body 22 toward the battery 12 present a greater challenge when designing impact absorbing elements for the battery 12 due to the reduced amount of crush space available between the side body 22 and the battery 12.

Figure 2:
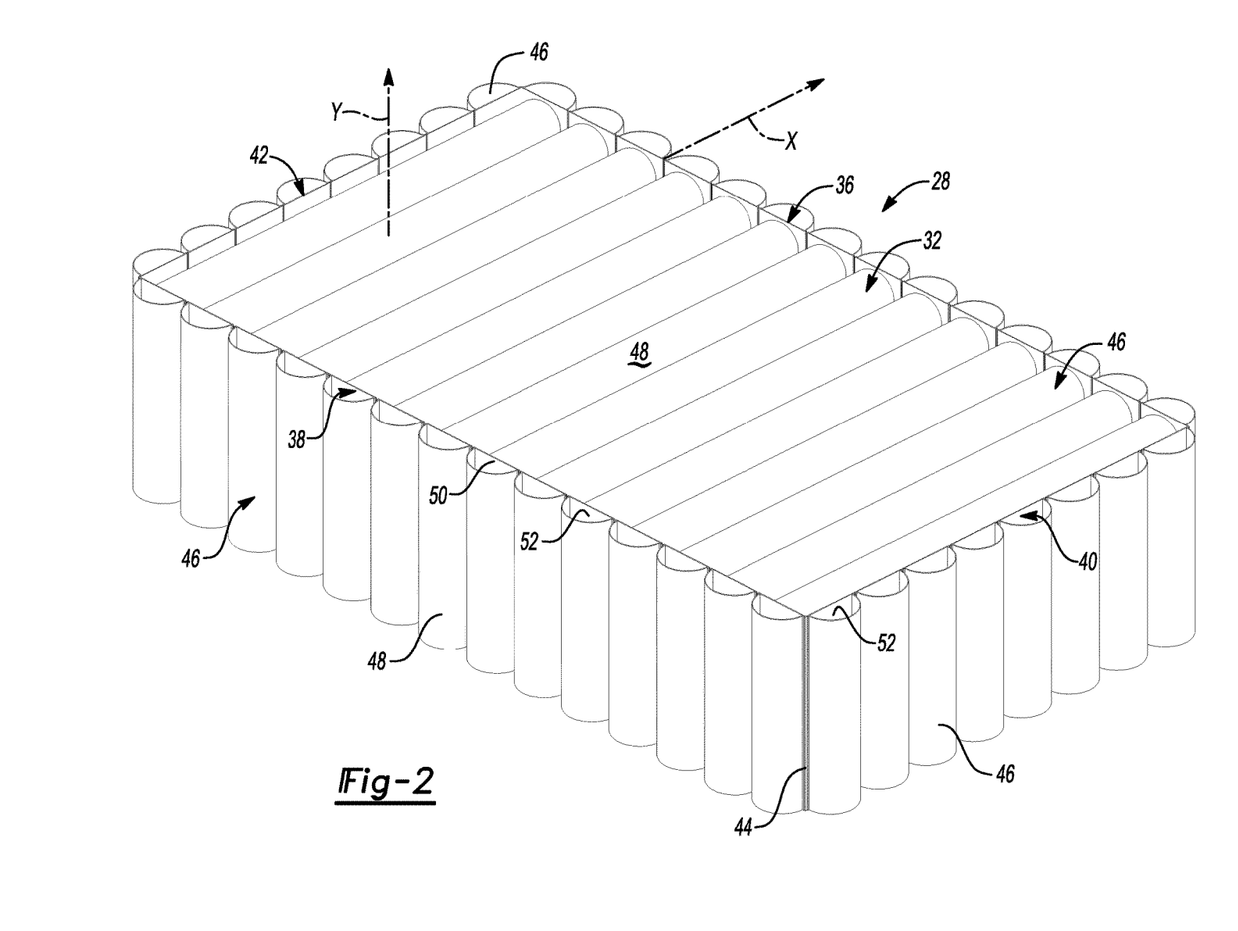
FIG. 2 is a perspective view of a first embodiment of a battery enclosure including semi-cylindrical impact absorbing members provided on the sides and top of the enclosure.
Figure 3:
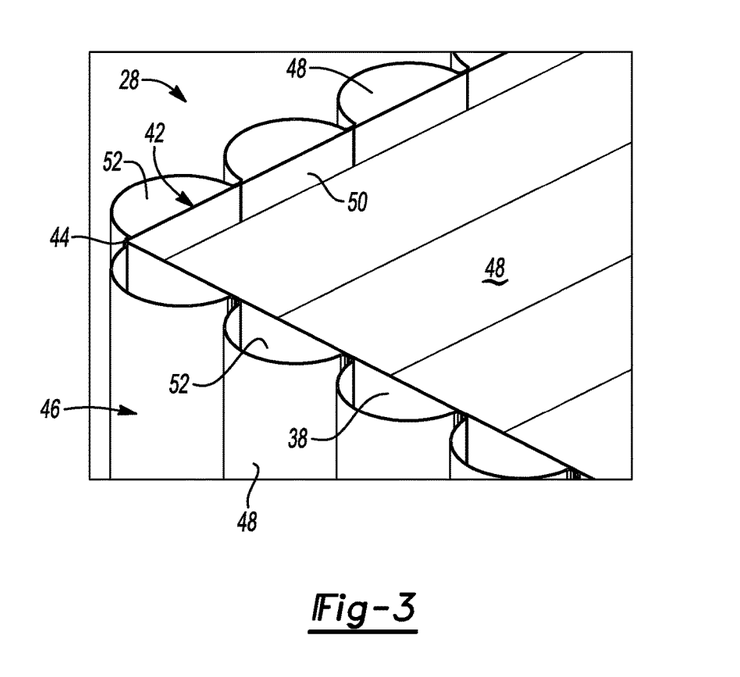
FIG. 3 is a fragmentary enlarged perspective view of a portion of the battery enclosure illustrated in FIG. 2.

Referring to FIGS. 2 and 3, a first embodiment of the battery enclosure, generally indicated by reference numeral 28, is shown to include a bottom wall 30 (shown in FIG. 1) and a top wall 32. A front wall 36 faces the front bumper 24 (shown in FIG. 1) and a rear wall 38 faces the rear bumper 26 (shown in FIG. 1). The battery enclosure 28 includes a right side wall 40 and a left side wall 42. The side walls are joined at corners 44.

Impact absorbing members, generally indicated by reference numeral 46, include an impact absorbing wall 48 and a planar wall 50. It should be understood that the impact absorbing members may be formed integrally with the walls 30-42 or may be attachments to the walls. The impact absorbing wall 48 in the embodiment illustrated in FIGS. 2 and 3 is an arcuate, or semi-cylindrical, wall that forms a pocket 52 with the planar wall 50. The impact absorbing wall 48 is an arcuate shaped elongated member with the arc of the wall being generated about a horizontal axis X when the impact absorbing member 46 is mounted in a horizontal orientation or a vertical axis Y when the impact absorbing member 46 is formed on the battery enclosure 28 integrally.

In FIGS. 2 and 3, the top wall 32 is shown spanning the top surface of the battery 12 (shown in FIG. 1) and extends from the front wall 36 to the rear wall 38 and between the right side wall 40 and the left side wall 42. The impact absorbing wall 48 of the impact absorbing members 46 shown on the top wall 32 are recessed below the upper ends of the walls 36-42. In the embodiment shown in FIGS. 2 and 3, impacts to the sides or front and rear wall are absorbed by the impact absorbing members 46 on the front wall 36 and rear wall 38. The impact absorbing members or wall 48 on the bottom wall 30 and top wall 32 are not involved until the battery enclosure 28 is deformed.

Figure 4:
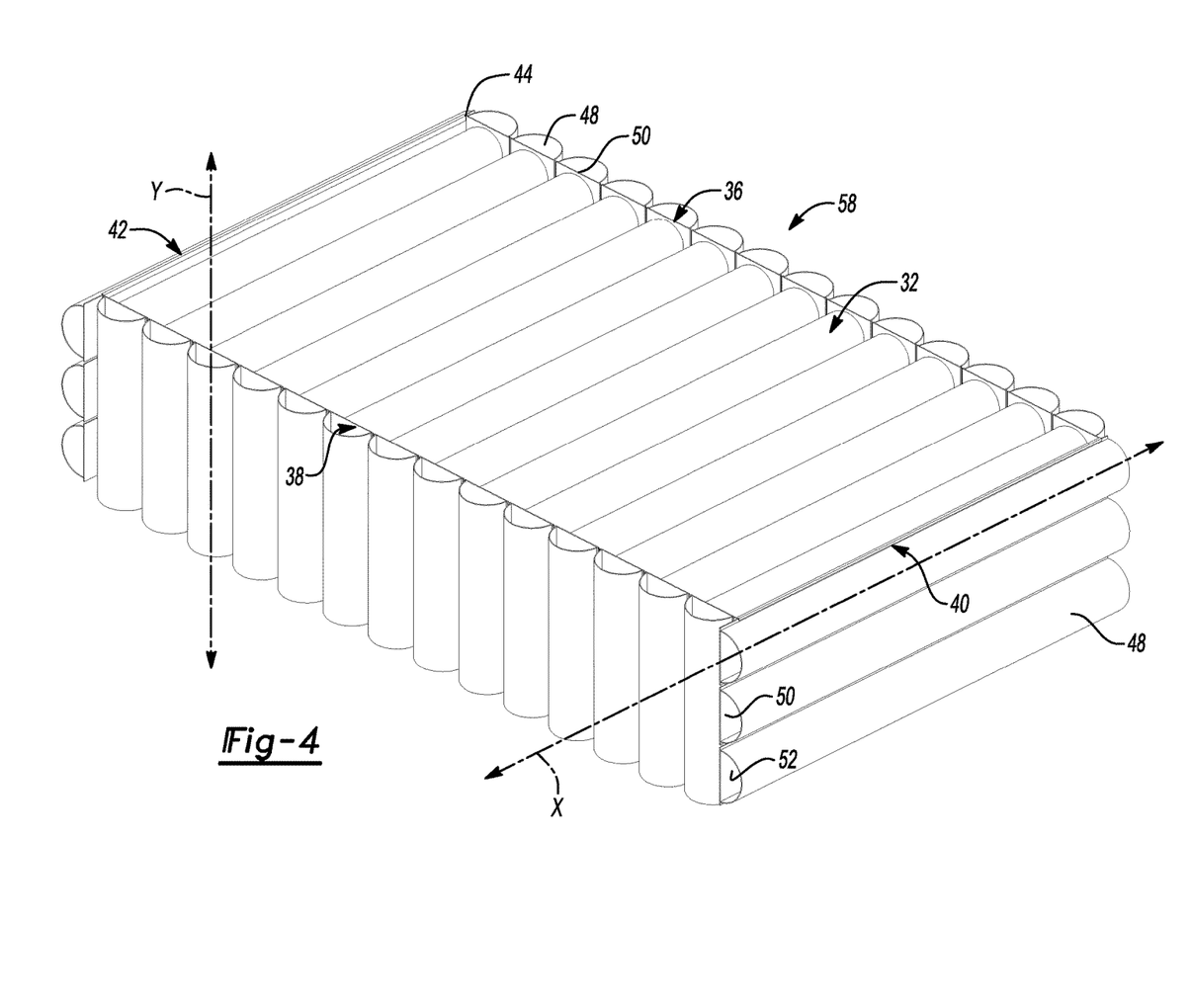
FIG. 4 is a perspective view of a second embodiment of a battery enclosure including semi-cylindrical impact absorbing members provided on the sides and top of the enclosure.
Figure 5:
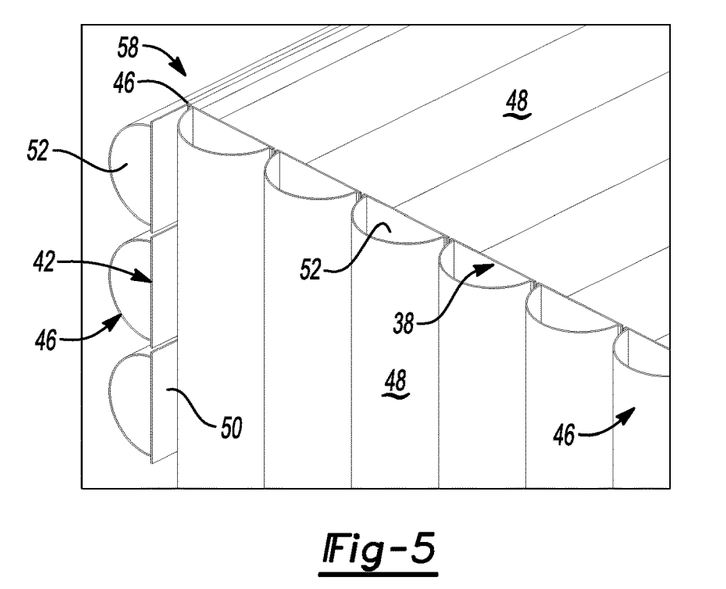
FIG. 5 is a fragmentary enlarged perspective view of a portion of the battery enclosure illustrated in FIG. 4.

Referring to FIGS. 4 and 5, a battery enclosure 58 is illustrated that is made according to a second embodiment of the present disclosure. Battery enclosure 58 is similar to battery enclosure 28 and the same reference numerals will be used to describe similar parts of the various embodiments disclosed herein. Battery enclosure 58 includes side walls 40, 42 that extend beyond the planar wall 50 of the front wall 36 and rear wall 38. The impact absorbing members 46 include an impact absorbing wall 48 that is in an arcuate shape and a planar wall 50 that is either attached to or formed integrally with the front wall 36 and rear wall 38.

Loads applied to the impact absorbing members 46 on the rear wall 38 are also resisted by the impact absorbing members 46 that are disposed on the side walls 40 and 42. A portion of any impact force applied to the rear wall 38 is absorbed by collapsing the impact absorbing walls 48 toward the planar wall 50. In addition, the impact absorbing member 46 on the side walls 40, 42 result in an axial load being applied to the ends of the impact absorbing members 46 on the side walls 40 and 42.

Figure 6:
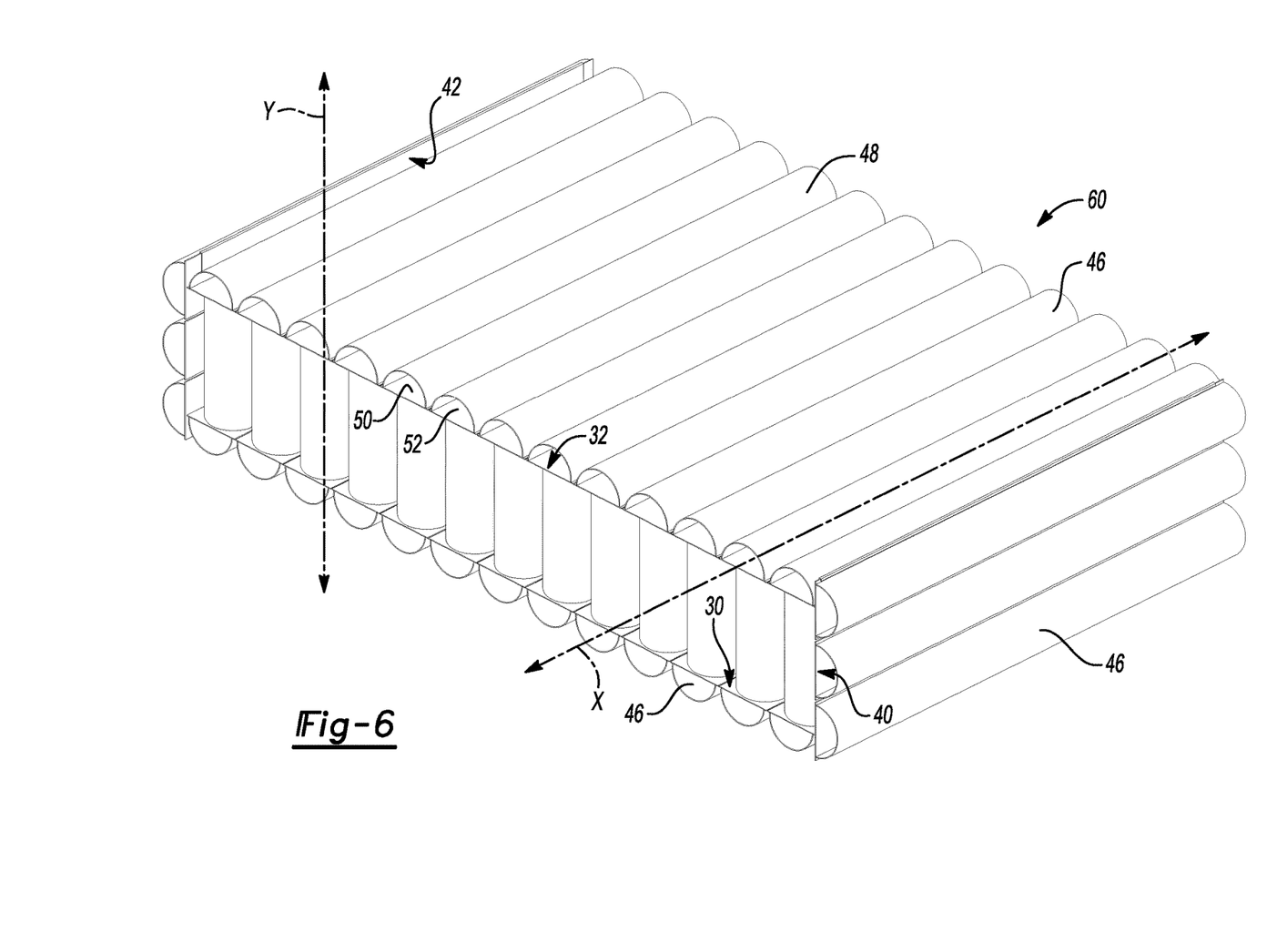
FIG. 6 is a perspective view of a third embodiment of a battery enclosure including semi-cylindrical impact absorbing members provided on the sides and top of the enclosure.
Figure 7:
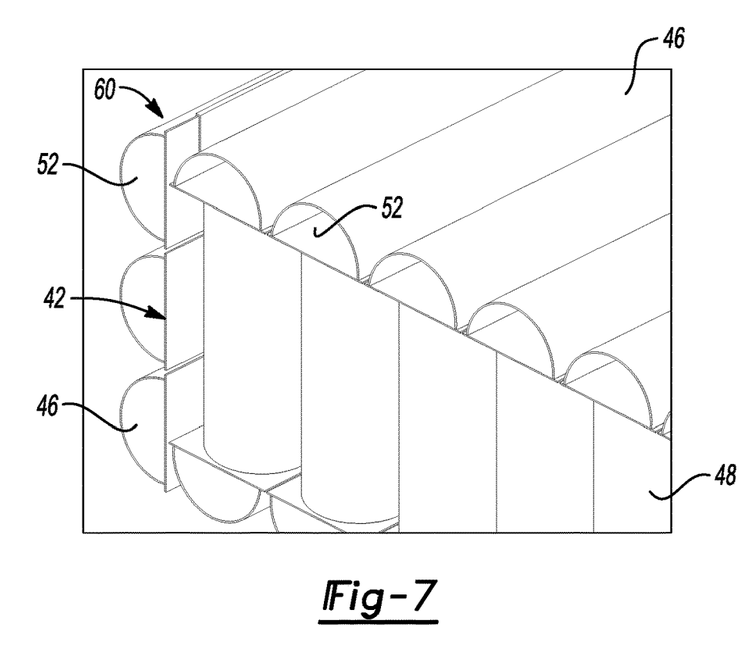
FIG. 7 is a fragmentary enlarged perspective view of a portion of the battery enclosure illustrated in FIG. 6.

Referring to FIGS. 6 and 7, a third embodiment of the battery enclosure is generally indicated by reference numeral 60. The third embodiment 60 also includes horizontally extending impact absorbing members 46 on both the right and left side and also on the top and bottom walls 30, 32. The impact absorbing members 46 on the right and left side walls 40 and 42 extend beyond the front wall 36 and rear wall 38 and are coextensive with the impact absorbing wall 48 of the impact absorbing members 46 on the front wall 36 and rear wall 38. The horizontally extending impact absorbing members 46 on the top and bottom walls also overhang the impact absorbing members 46 on the front wall 36 and rear wall 38 and are coextensive with the impact absorbing wall 38 on the front wall 36 and rear wall 38.

In this embodiment, the third embodiment 60 loads applied to the front and rear walls of the enclosure 60 are absorbed by the impact absorbing members 46 on the respective walls and are also absorbed by the axially directed loads applied to the impact absorbing members on the side walls 40, 42 and the top and bottom walls 30, 32.

Figures 8, 9:
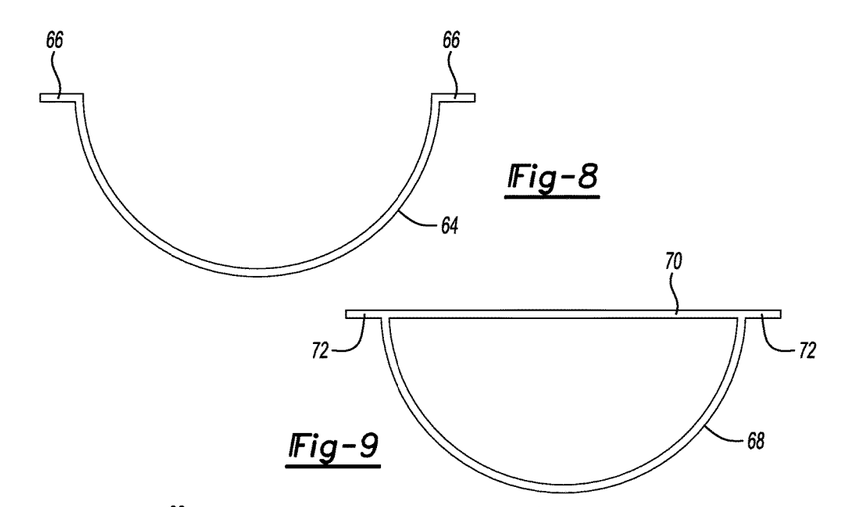
FIG. 8 is an end view of a first embodiment of a semi-cylindrical impact absorbing member.
FIG. 9 is an end view of a second embodiment of a semi-cylindrical impact absorbing member.

Referring to FIG. 8, an impact absorbing member 46 is illustrated that includes an arcuate portion 64 that is disposed between two side flanges 66. The arcuate portion 64 is the portion of the impact absorbing member 46 that absorbs impacts as it is deformed toward the wall to which it is attached. The side flanges 66 are used to secure the impact absorbing member 46 to the enclosure.

Referring to FIG. 9, another embodiment of an impact absorbing member 46 is shown that includes an arcuate portion 68 that is integrally formed with a planar portion 70. The planar portion 70 includes two outwardly extending side flanges 72 that extend outboard of the arcuate portion 68. Again, the arcuate portion 68 absorbs the impact as it collapses toward the planar portion 70. The side flanges 72 are used to secure the impact absorbing member to an enclosure. It should be noted that the embodiment shown in FIG. 9 may also be formed as an integral part of the battery enclosure wherein the planar portion 70 may be part of the respective wall of the battery enclosure 28, 58, and 60. Each of the walls 30-42 may be separately extruded and assembled together to form the battery enclosure.

Figure 10:
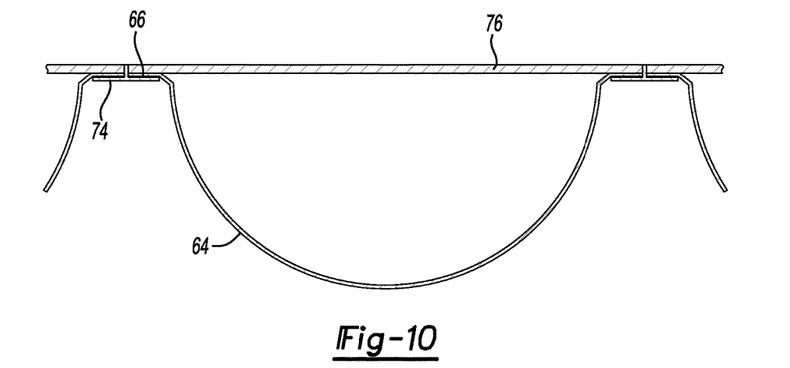
FIG. 10 is a fragmentary diagrammatic cross-section view of impact absorbing members retained on one of the walls of the battery enclosure by a T-shaped guide attached to the wall.

Referring to FIG. 10, an impact absorbing member 46 is shown to be attached to an enclosure wall 76 by a T-shaped guide 74. The T-shaped guide 74 is attached to the enclosure wall 76. The impact absorbing member 46 slides into the T-shaped guide 74 with the side flanges 76 being retained by the T-shaped guide 74. The arcuate portion 64 collapses toward the enclosure wall 76 in an impact.

Figure 11:
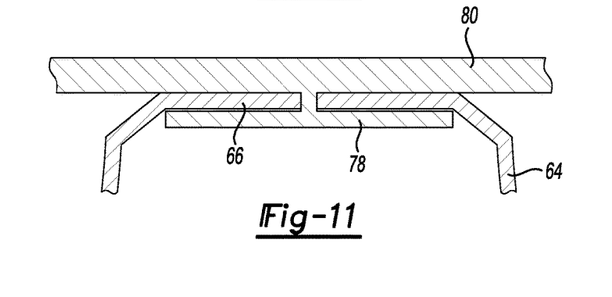
FIG. 11 is a fragmentary enlarged cross-section view of a T-shaped guide extruded as part of a wall that retains two impact absorbing members on one of the walls of the battery enclosure.

Referring to FIG. 11, another embodiment is shown wherein a T-shaped guide 78 is extruded, or integrally formed, with the enclosure wall 80. In this embodiment, it is not necessary to attach the T-shaped guide 78 to the enclosure wall 80, but they may be formed as an extrusion. The side flanges 66 are retained by the T-shaped guide 78 with the arcuate portion 64 of the impact absorbing member 46 being disposed between the two adjacent T-shaped guides 78.

Figure 12:
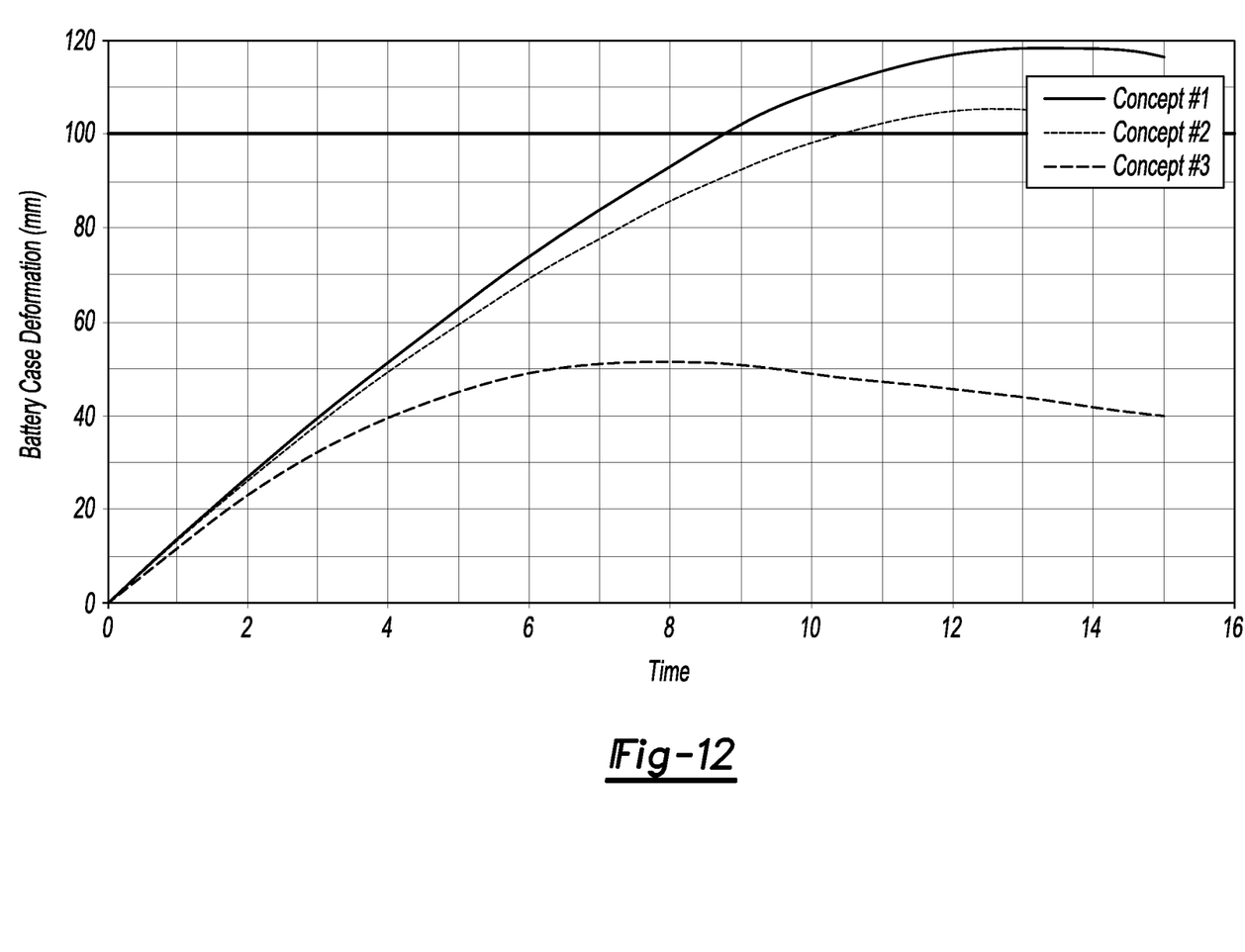
FIG. 12 is a graph of battery case deformation comparing the three different embodiments of the battery case having impact absorbing members made according to FIGS. 2, 4 and 6, respectively.

Referring to FIG. 11, a graph showing a simulated test result for each of the three embodiments described above. The graph illustrates the battery case deformation in millimeters over time and illustrates the test results for embodiment one, concept one, of the battery enclosure 28 and shows that battery case deformation in embodiment one of the battery enclosure 28 results in a maximum battery deformation of slightly less than 120 mm.

Concept two corresponds to the simulated test results for the second embodiment of the battery enclosure 58. The battery enclosure 58 resulted in a maximum deformation of approximately 105 mm.

Concept three corresponds to the simulated test results for the third embodiment, battery enclosure 60. In the third embodiment, the side walls and top and bottom walls overhang or extend to the impact absorbing wall on the front and rear walls 36 and 38. The deformation is limited to a deformation of slightly more than 50 mm.

In conclusion, the battery enclosure 60 results in a mark reduction of battery case deformation compared to either battery enclosure 58 or battery enclosure 28 that correspond to concepts one and two in the graph shown in FIG. 11. The first and second embodiments 28 and 58 both show marked improvements compared to an enclosure without the impact absorbing members 46 that showed about 440 mm of crush over a period of 80 milliseconds.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A housing for a traction motor battery of a vehicle comprising:
   right, left, front, and rear vertical walls;
   top and bottom horizontal walls; and
   a plurality of impact absorbers each including a semi-cylindrical wall generated about a cylindrical axis and having a planar wall, the cylindrical axis being horizontally oriented on right, left, top, and bottom walls and overhanging the impact absorbers on the front and rear walls with the cylindrical axis being vertically oriented.

2. The housing of claim 1 wherein the impact absorbing members are arc-shaped and are generated as an arc about the cylindrical axis.

3. The housing of claim 1 wherein the impact absorbers are retained by T-shaped guides on the outer surface of each of the right, left, front, rear, top, and bottom walls.

4. The housing of claim 1 wherein the impact absorbers are integrally formed in one piece on an outer surface of each of the right, left, front, rear, top, and bottom walls.

5. A housing for a battery of a vehicle comprising:
   plural vertical walls including front, rear, right, and left walls;
   plural horizontal walls including top and bottom walls; and
   plural impact absorbers having a planar wall attached to outer surfaces of the walls, impact absorbers on the right left, top, and bottom walls include the planar wall and a semi-cylindrical wall defining a semi-cylindrical pocket extending horizontally fore-and-aft beyond the front and rear walls.

6. The housing of claim 5 wherein the impact absorbers the semi-cylindrical wall is arc-shaped and generated as an arc about a cylindrical axis that is parallel to a length of the semi-cylindrical pocket defined by the impact absorbers.

* * * * *